C. E. & W. G. WERTS.
GRADING MACHINE.
APPLICATION FILED JAN. 25, 1915.
1,235,086.
Patented July 31, 1917.
3 SHEETS—SHEET 1.
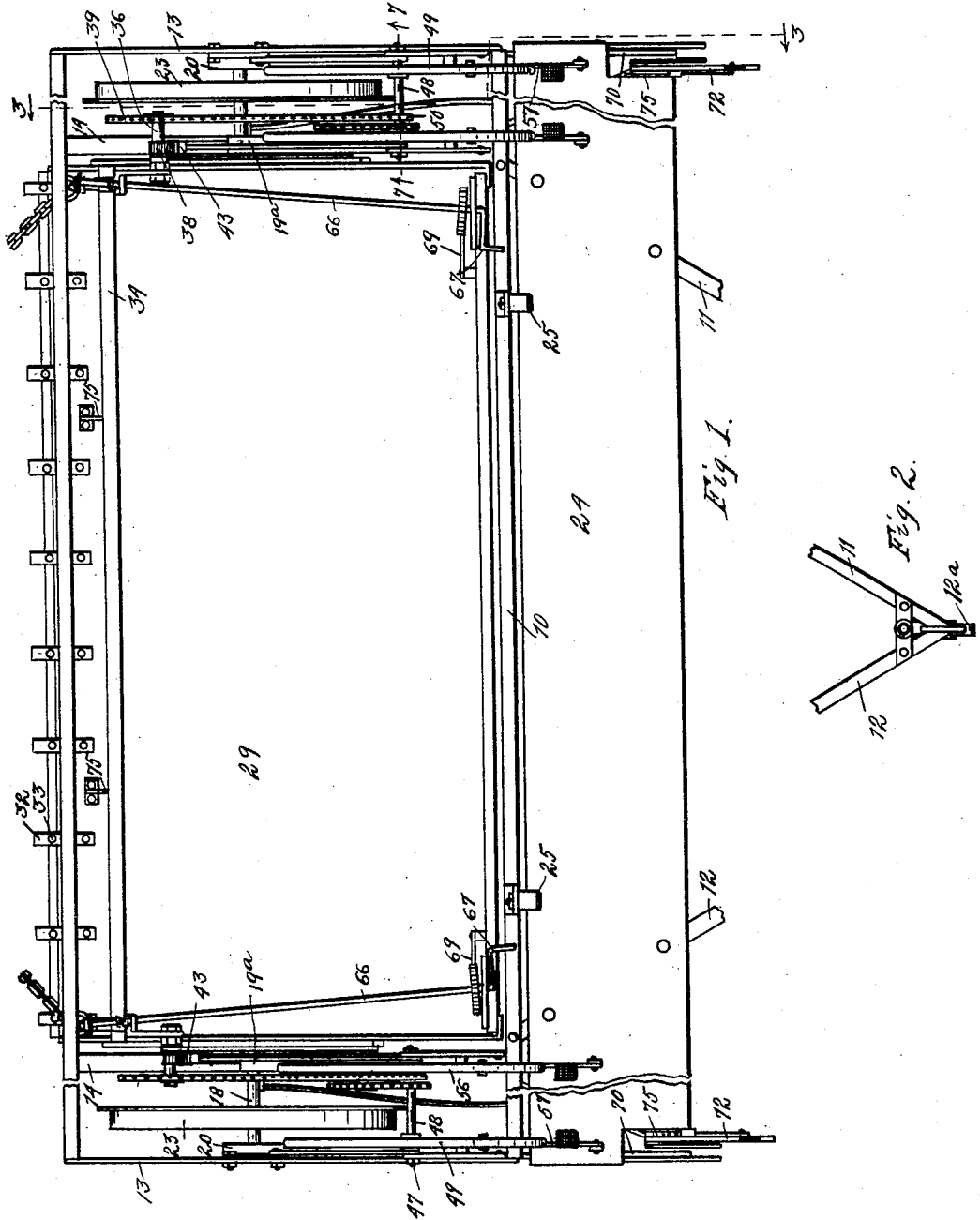

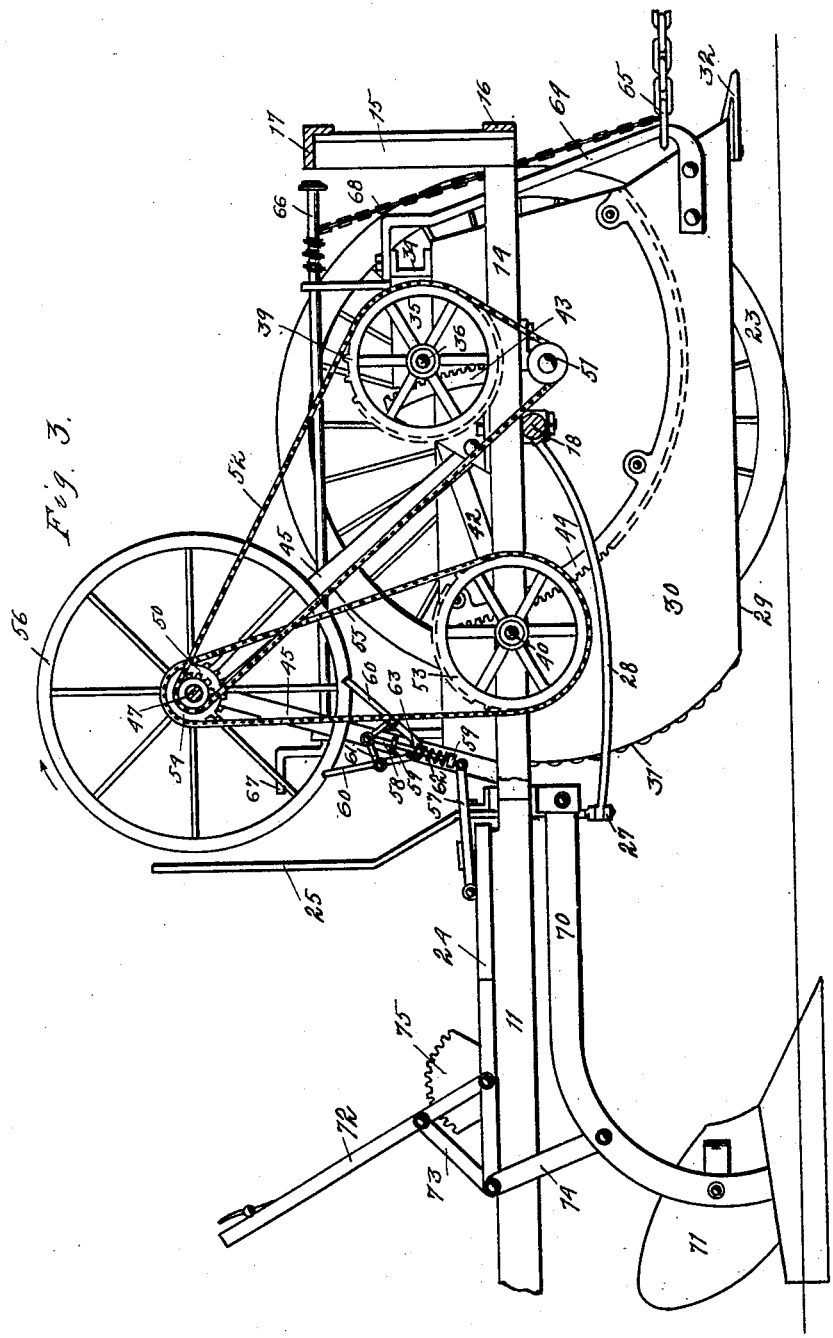

C. E. & W. G. WERTS.
GRADING MACHINE.
APPLICATION FILED JAN. 25, 1915.
1,235,086.
Patented July 31, 1917.
3 SHEETS—SHEET 3.
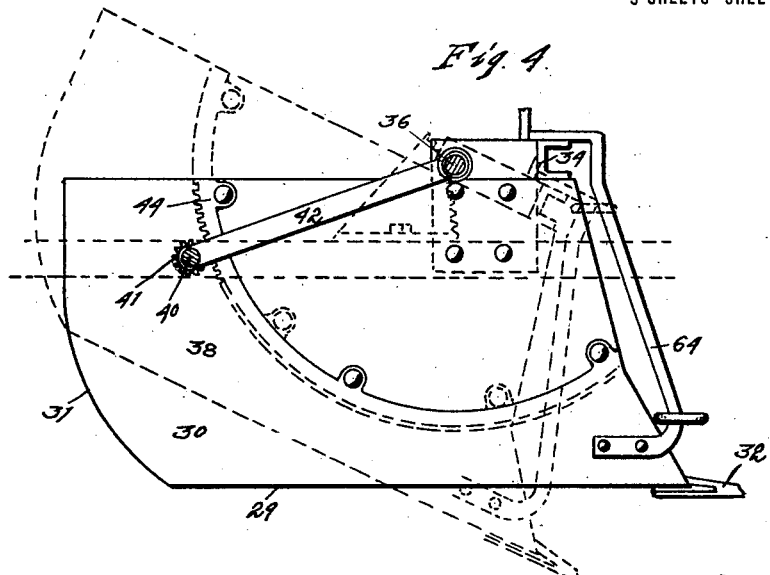
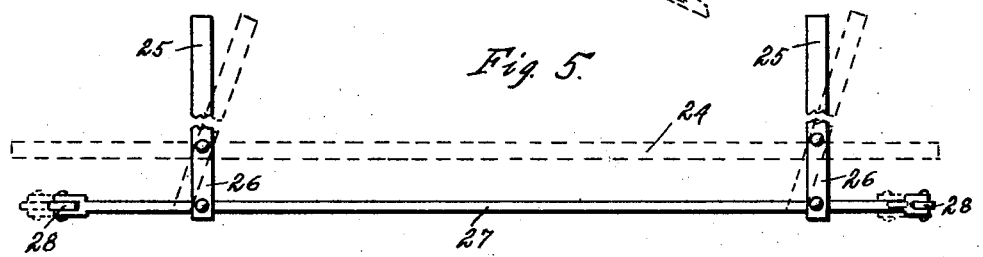
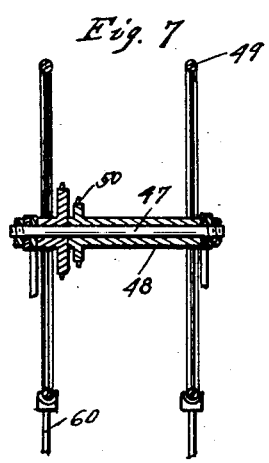
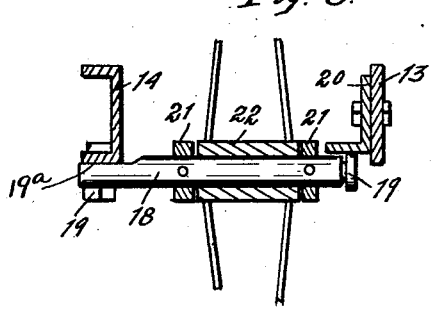

UNITED STATES PATENT OFFICE.

CLIFTON E. WERTS AND WALTER G. WERTS, OF RUSSELL, IOWA.

GRADING-MACHINE.

1,235,086.   Specification of Letters Patent.   Patented July 31, 1917.

Application filed January 25, 1915. Serial No. 4,364.

*To all whom it may concern:*

Be it known that we, CLIFTON E. WERTS and WALTER G. WERTS, citizens of the United States, and residents of Russell, in the county of Lucas and State of Iowa, have invented a certain new and useful Grading-Machine, of which the following is a specification.

The object of our invention is to provide a grading machine of simple, durable and inexpensive construction.

A further object is to provide such a grading machine having a scoop or the like, suitably mounted on wheels and provided with adjusting and controlling mechanism, whereby said scoop may be fixed in a variety of positions.

Still a further object is to provide simple and novel mechanism for fixing said scoop with its cutting blade at various angles to the ground.

Still a further object is to provide such a machine with an adjustable mounted scoop, and with means for changing the point where the power is hitched to the machine in such a way that such power may be used to dump or discharge the contents of the scoop.

A further object is to provide in such a machine simple means for guiding the device.

A further object is to provide simple and inexpensive means of novel construction for mounting the wheels and the scoop on the frame.

Our invention consists in the construction, arrangement, and combination of the various parts of the device whereby the objects contemplated are attained as hereinafter more fully set forth, pointed out in our claims and illustrated in the accompanying drawings, in which:

Figure 1 shows a top or plan view of a grading machine embodying our invention.

Fig. 2 shows a top or plan view of the third wheel.

Fig. 3 shows a side elevation, partly in section taken on the line 3—3 of Fig. 1.

Fig. 4 shows a vertical sectional view illustrating one of the scoops and part of its operating mechanism.

Fig. 5 shows a detail view of part of the steering mechanism.

Fig. 6 shows a vertical transverse sectional view illustrating the axle and means for connecting it with the frame, and Fig. 7 shows a vertical sectional view taken on the line 7—7 of Fig. 1.

In the exemplification of our invention shown in the accompanying drawings, we have used the reference numeral 10 to indicate a transverse frame member. Extending rearwardly from the member 10 near its ends, are frame members 11 and 12, inclined rearwardly and toward each other.

The rear ends of the members 11 and 12 are connected, and suitably mounted thereon is a caster wheel 12$^a$. Extending forwardly from each end of the member 10 is a frame member 13.

Spaced inwardly from the frame members 13 are parallel frame members 14. Extending upwardly from the members 14 and 13 at the forward ends thereof are short upright standards 15. The forward ends of the right-hand members 13 and 14, and the forward ends of the left-hand members 13 and 14 are connected by a frame member 16. A transverse frame member 17 connects the upper ends of all the members 15.

Pivotally mounted below each frame member 14 at 19$^a$ to swing in a horizontal plane is an axle 18, extending laterally away from the frame member 14. On the outer end of each axle 18, is a roller 19, which is mounted below the flange of an angle iron 20 on the adjacent member 13, as illustrated in Fig. 6.

On each axle 18 are fixed collars 21, between which is the hub 22 of a wheel 23, on which the machine travels.

Mounted on the members 11 and 12 is a platform 24. Pivoted on the platform near the opposite ends thereof, at the forward portions of said platform are two upwardly extending levers 25, having downwardly extending portions 26. A transverse bar 27 is pivoted to the lower ends of the members 26.

Extending forwardly from the ends of the bar 27 are links 28, which extend forwardly in the machine and are fixed at their forward ends to the axles 18. It will be seen that by swinging the levers 25 laterally, the bar 22 will be moved longitudinally, thereby simultaneously moving the wheels 23 laterally for guiding the machine. The wheels 23 may be of any suitable construction, but as shown are provided with flanges to prevent lateral slipping on the ground. Thus it will be seen that a movement of the lever 25 will cause a certain lateral movement of the wheels 23.

Mounted between the frame members 14, is a scoop, having the bottom 29, the sides 30 and the back 31. The forward cutting edge of the scoop is provided with a plurality of detachable teeth 32, secured to the bottom 29, by means of bolts 33. Connecting the forward upper ends of the sides 30, is a frame member 34 preferably of channel-iron. Secured to the channel-iron frame member 34, and the upper edge of the sides 30, are rearwardly extending bearings 35, in which are mounted short shafts 36.

On each shaft 36 is a small pinion 38, which is loose on the shaft, the shaft being rotatably mounted, loosely. Mounted on the outer ends of each shaft 36 is a sprocket wheel 39, fixed to the adjacent pinion 38 by a suitable sleeve.

Mounted in each frame member 14, rearwardly of the axle, is a short shaft 40, on which is a pinion 41. The shafts 40 and 36 on each side of the machine are connected by a rigid bar 42, in which said shafts are rotatably mounted. It is important that the shafts 40 and 36 be properly spaced from each other, and the bar 42 helps to hold them true to their proper positions.

Mounted on each frame member 14, is an upwardly and rearwardly curved rack-bar 43. The rack-bars 43 are in mesh with the pinions 38. Each rack-bar 43 is curved on the arc of a circle, having its center at the center of the shaft 40, on the same side of the machine.

Fixed to the outer surface of each side 30 is a curved rack-bar 44, in mesh with one of the pinions 41. Each rack-bar 44 is curved on the arc of a circle, having its center at the center of the shaft 36 on the same side of the machine.

Extending upwardly from the frame members 13 and 14, on each side of the machine are supporting frame members 45. Mounted in the upper ends of the frame members 35 on each side of the machine is a short transverse shaft 47. Rotatably mounted on each shaft 47 is a sleeve 48, on one end of which is a hand wheel 49. Fixed on the other end of each sleeve 48 is a pinion 50. On a bracket 51ᵃ on each frame member 14 is a chain guide sprocket 51, which is approximately in the circle of which the shaft 36 traverses an arc.

Mounted on the pinion 50, the sprocket 39 and the sprocket 51, is a sprocket chain 52. The bracket 51ᵃ is adjustable to permit the sprocket to be adjusted to serve as a chain tightener by taking up slack. It will thus be seen that when the operator, standing on the platform 24, rotates the hand wheels 49 simultaneously, in the direction indicated by the arrow in Fig. 3, the cutting edge and forward portion of the scoop will be lowered. When the hand wheel 49, on one side of the machine is rotated in the same direction, the forward end of the scoop on that machine will be lowered. In this way the scoop may be tilted from side to side, for regulating the cut as desired. Sufficient play is allowed to permit the operation of the hand-wheel at one end only, for tilting the scoop from end to end to a limited degree. The racks and pinions and the chains and sprockets are of such size and are permitted sufficient play to permit of such limited tilting of the scoop as to regulate the depth of cut without throwing the parts out of gear. On each shaft 40 is a sprocket gear 53, in line with the sprocket 54, fixedly mounted on the shaft 47. On the sprockets 54 and 53 is a chain 55.

Fixed on the sprocket 54 is a hand wheel 56. It will be understood that the construction for controlling the scoop is the same on both sides of the machine.

When the hand wheel 56 is rotated in the direction indicated by the arrow in Fig. 3, the sprocket 40 and the pinion 41 will be rotated in the same direction, and the rear end of the scoop will be lowered. By rotating both of the hand wheels 56 in the opposite direction, the rear end of the scoop may be raised for placing the scoop in dumping position.

It will be seen that by proper manipulation of the hand wheel, the scoop, as a whole, may be raised or lowered, its front end may be tilted as desired for regulating the cut of the teeth 32. The parts are permitted sufficient play, so that either end of the scoop may be raised or lowered to some extent with relation to the other end thereof.

For each hand wheel 49 and 56, a bracket device is provided. Each bracket device comprises a lever 57, pivoted to the platform 24, and extending forwardly in the machine. The forward end of each lever 57 is pivoted to a rod 58, slidably mounted in collars or sleeves 59, on one of the brace members 45.

Pivoted to the brace members 45 adjacent to each rod 58, are the ends of upwardly extending bracket members 60, which together, have substantially the form of a V. The upper ends of the bracket members 60 are grooved to fit the hand wheel 56.

Pivoted to the upper end of the rod 58, are two links 61, which extend to the respective members 60. A spring 62 mounted on the rod 58 between the lower collar 59, and a pin 53 extending through the rod 58, tends to hold the rod 58 at its upper limit of movement, and to hold the members 60 pressed against the hand wheel. The construction for each hand wheel may be the same. When the lever 57 is depressed, by the foot, or otherwise, the rod 58 is drawn longitudinally downwardly against the pressure of the spring, thereby throwing the upper ends of the members 60 apart, and releasing them from engagement with their proper hand wheel.

Our improved grading machine may be operated by any suitable power, and we provide the following means for hitching it to the machine:

Secured to the angle 34, near each end thereof, and extending downwardly to the lower part of the scoop is a bar 64, spaced forwardly from the wall 30 of the scoop.

Mounted on the bar 64 are draft devices 65. Near each side of the machine, a rod or shaft 66 is rotatably mounted in suitable brackets. At the rear end of each rod 66 is formed a crank 67. Flexible devices 68 are secured to the draft devices 65, and wound upon the respective rods or shafts 66. It will be seen that by rotating the crank 67, the draft devices may be raised or lowered as desired for imposing the draft on the scoop at any desired height. Suitable pawl and ratchet locking devices 69 are provided for securing the shafts 66 in any of their positions.

On each side of the machine in the rear of the scoop, there is pivotally mounted the forward end of a plow-beam 70, on which is a plow 71. Pivoted to the frame above each plow-beam 70, is a lever 72, having an arm 73, fixed thereon, and extending away from the lever at an angle thereto. Pivotally connected to the adjacent beam 70, and to each arm 73, is a link 74. The levers 72 are provided with the ordinary spring actuated pawls, which coact with the sectors 75. It will be seen that by the operation of the levers 72, the pawls 71 may be raised or lowered as desired.

In the practical operation of our improved grading machine, the machine may be propelled by any power such as an engine, cable, or other suitable means. It will be seen that in so much as the scoop 30 can be adjusted by raising or lowering either end or by raising or lowering its front or rear portions, that it has great flexibility for grading in any type of ground.

It is also to be noted, from the foregoing description, that the scoop can be permanently fixed in any of its adjusted positions, so that during the lowering operation, the scoop does not jerk or jump. When the scoop has been lowered, the hand wheels, can be properly operated, first for tilting its forward end upwardly and then for lifting the entire scoop until it clears the ground. When it is desired to unload or dump the scoop, its forward end may be lowered until the teeth 32 engage the ground whereupon by operating the machine forwardly, the scoop may be moved to dumping or discharging position. It will be understood that the hand wheels can also be operated for raising the scoop, and then for tilting it to discharge position.

It may be mentioned that braces 75 are provided and are secured to the frame member 34, and extending downwardly therefrom to the forward portion of the bottom 29, near the cutting edge thereof for reinforcing the cutting edge, and holding the bottom of the scoop rigid.

Attention is called to the combination of the tiltable scoop with the caster wheel, and the large wheels 23, capable of lateral movement. On account of this construction, the machine may be used with a cable secured to it at each end and operated by an engine on two sides of a field.

Attention is called to the advantage of the adjustable hitch, whereby the draft on the scoop may be adjusted as desired. This is especially important where it is desired to dump or discharge the load from the scoop by lowering the forward edge thereof, until the teeth touch the ground. At the same time the draft devices may be raised to the upper parts of the members 64, so that the forward draft in said device, assists in completing the movement of the scoop to its dumping or discharge position. The draft devices are independently adjustable for giving complete control to the machine on side hills or the like.

The scoop is readily raised above the ground, when it is desired to haul the machine on an ordinary road.

It will be understood that some changes may be made in the construction and arrangement of the parts of our device without departing from its essentials and purposes, and it is our intent to cover by this application any such changes which may be included within the scope of our claims.

We claim as our invention:

1. In a device of the class described, a frame on wheels, a scoop mounted on the forward portion of the frame, and capable of tilting movement, and draft devices adjustably mounted on said scoop.

2. In a device of the class described a frame on wheels, a scoop mounted on the forward portion of the frame and capable of tilting movement, draft devices adjustably mounted on said scoop, and means for adjusting said draft devices, accessible to an operator at the rear of the scoop.

3. In a device of the class described, a frame on wheels, a scoop mounted on the forward portion of the frame and capable of tilting movement, draft devices adjustably mounted on said scoop, a platform on said frame, and operating devices accessible to an operator on the platform for independently or simultaneously raising or lowering the ends of said scoop, said means being capable of holding said scoop in any of its adjusted positions.

4. In a device of the class described, a frame on wheels, a scoop mounted on the forward portion of the frame and capable of tilting movement, a platform on said frame, and operating devices accessible to an operator on the platform for independently or simultaneously raising or lowering the ends of said scoop for raising or lowering its front or rear parts, said means being capable of holding said scoop in any of its adjusted positions, and including coacting gears and rack-bars on the scoop and the frame.

5. In a device of the class described, a frame on wheels, a scoop mounted on the frame, a platform on the frame, operating devices accessible to an operator on the platform for independently or simultaneously raising or lowering the ends of said scoop, and for raising its front or rear part, said means being capable of holding said scoop rigidly in one of its adjusted positions, and inclined at each end of the scoop, a pinion on the scoop, a rack-bar on the scoop, curved on the arc of a circle having its center at the center of said pinion, a pinion on the frame in mesh with said rack-bar, and a rack-bar on the frame curved on the arc of a circle having its center at the center of the last pinion arranged in mesh with the pinion on the scoop.

6. In a device of the class described, a frame, on wheels, a scoop mounted on said frame, a platform on said frame rearwardly of the scoop, operating devices for raising or lowering the ends of said scoop and for raising or lowering it at its front or rear parts, said means including a pinion on the scoop, a rack-bar on the scoop curved on the arc of a circle having its center at the center of said pinion, a pinion on the frame in mesh with said rack-bar, a rack-bar on the frame in mesh with the pinion on the scoop, curved on the arc of a circle having its center at the center of the last pinion, means for rotating said pinions including pairs of hand-wheels accessible from the platform, the members of each pair being close together, and being connected with the respective pinion on one end of the scoop, and means for holding said last means inoperative.

7. In a device of the class described, a frame mounted on wheels, a scoop adjustably mounted on said frame, having a bottom, rear and side walls, draft devices adjustable with relation to the forward edges of the side walls up and down the same.

8. In a device of the class described, a frame mounted on wheels, a scoop adjustably mounted on said frame, having a bottom, rear and side walls, draft devices adjustable with relation to the forward edges of the side walls up and down, and means for adjusting either of said draft devices independently of the other.

9. In a device of the class described, a frame mounted on wheels, a scoop adjustably mounted on said frame, having a bottom, rear and side walls, draft devices adjustable with relation to the forward edges of the side walls up and down, and means for adjusting either of said draft devices independently of the other, from a position in the rear of the scoop.

10. In a device of the class described, a frame mounted on wheels, a scoop adjustably mounted on said frame, having a bottom, rear and side walls, draft devices adjustable with relation to the forward edges of the side walls up and down, and means for adjusting either of said draft devices independently of the other, from a position in the rear of the scoop, and for holding the draft devices in their adjusted positions.

11. In a device of the class described, a frame mounted on wheels, an adjustable scoop mounted on said frame and capable of tilting movement, operating devices for tilting said scoop including shafts mounted on the scoop and on the frame, a pinion on the shaft on the scoop, a rack-bar on the scoop curved on the arc of a circle having its center at the center of said pinion, a pinion on the shaft on the frame, and a rack-bar on the frame curved on the arc of a circle having its center at the center of the last described pinion, a rack-bar connecting said shafts.

12. In a device of the class described, a frame mounted on wheels, a scoop adjustably mounted on said frame, a platform rearwardly of said scoop, means accessible from said platform for adjusting said scoop, draft devices on said scoop, and means accessible from said platform for adjusting said draft devices.

Des Moines, Iowa, January 16, 1915.

CLIFTON E. WERTS.
WALTER G. WERTS.

Witnesses:
W. B. WERTS,
W. J. MARSHALL.

Copies of this patent may be obtained for five cents each, by addressing the "Commissioner of Patents, Washington, D. C."